Patented May 29, 1923.

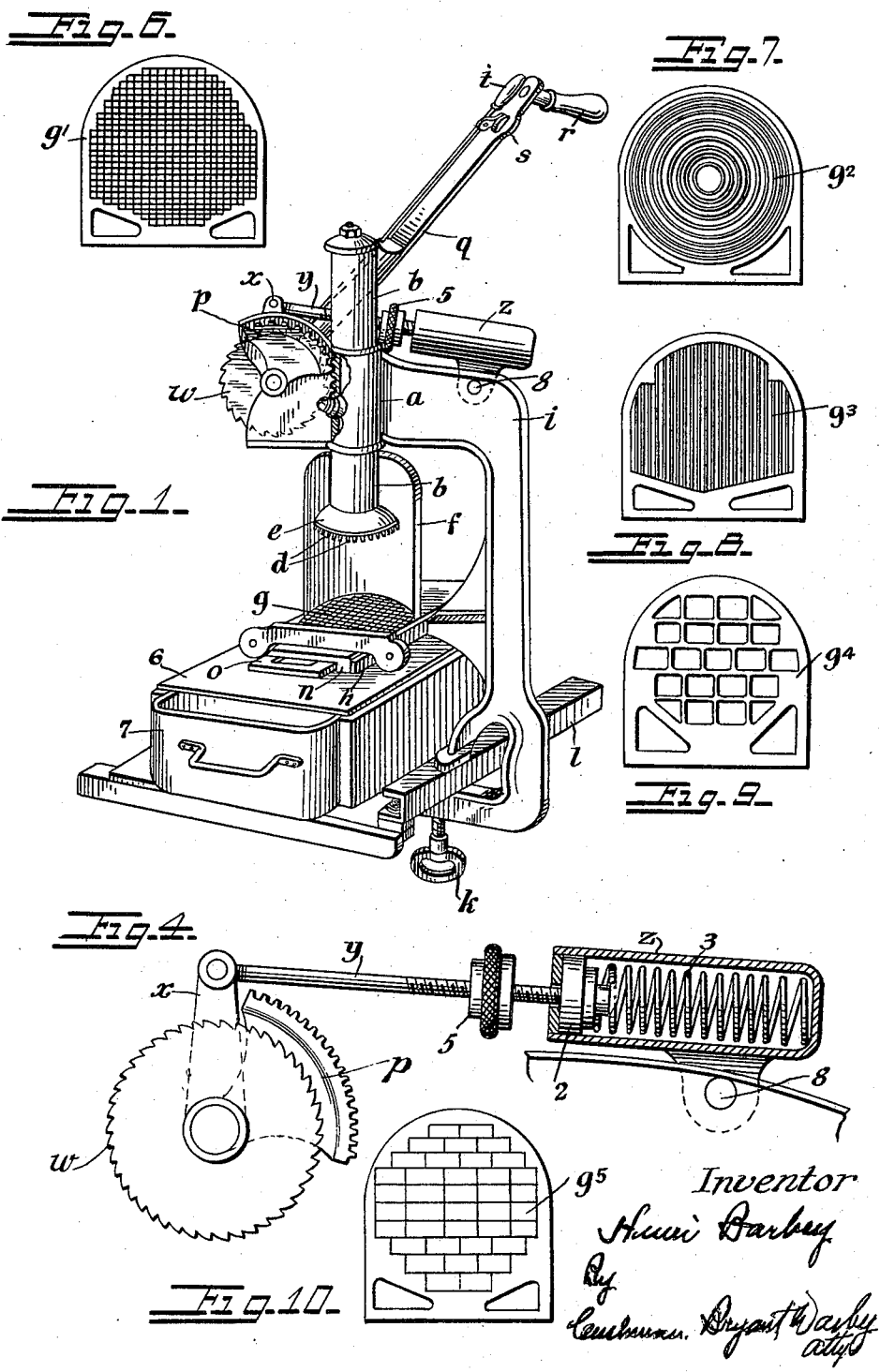

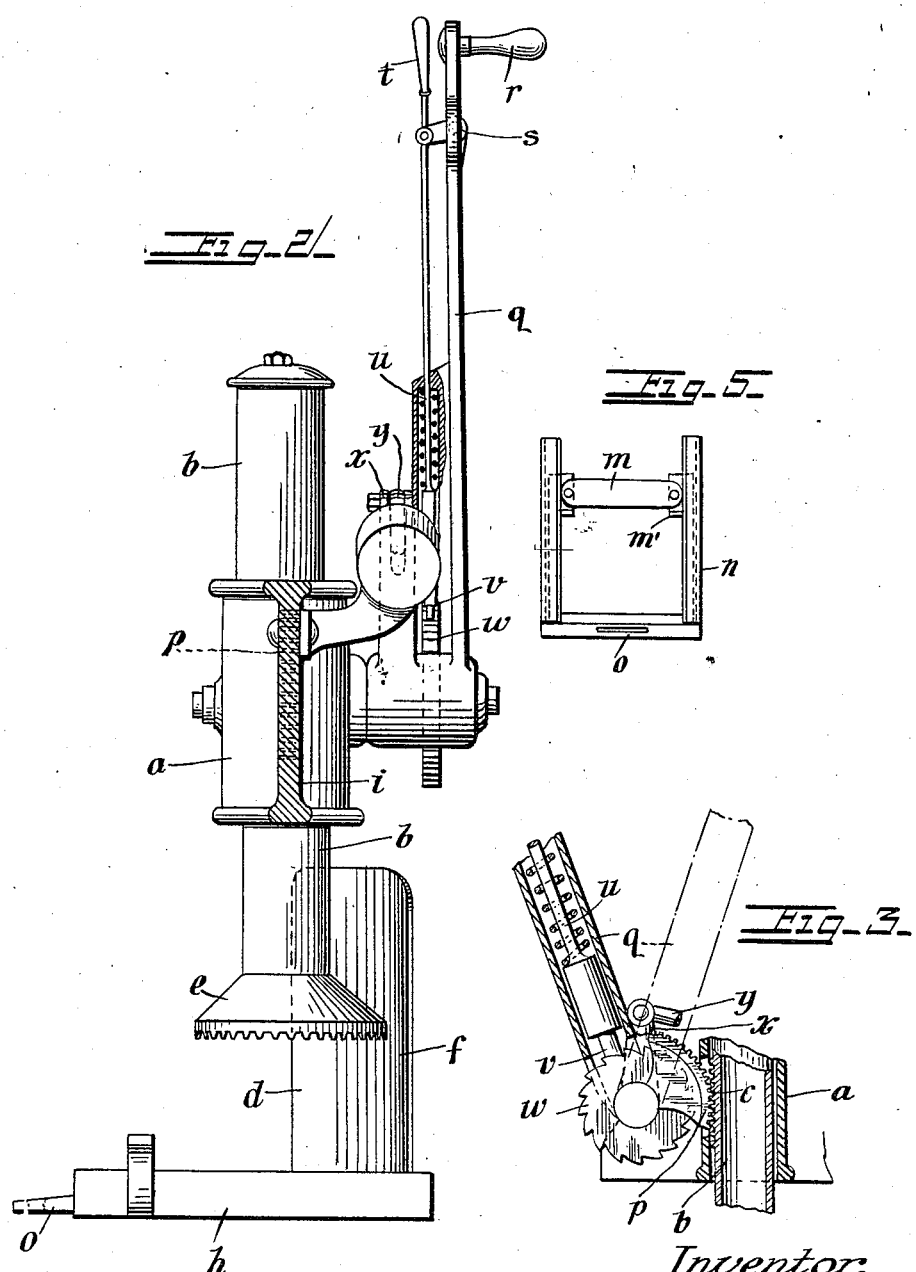

1,457,137

UNITED STATES PATENT OFFICE.

HENRI BARBEY, OF SCHILTIGHEIM, ALSACE, FRANCE.

MACHINE FOR CUTTING UP FRUITS AND VEGETABLES OF ALL KINDS, ESPECIALLY POTATOES.

Application filed September 25, 1922. Serial No. 590,366.

*To all whom it may concern:*

Be it known that I, HENRI BARBEY, a citizen of France, residing at Schiltigheim, Alsace, have invented a new and useful Improvement in a Machine for Cutting up Fruits and Vegetables of all Kinds, Especially Potatoes.

The invention relates to a machine the purpose of which is to cut fruits and vegetables of all kinds, such as potatoes, into slices, chips, cubes and the like, of any desirable size. This cutting is done with the help of a pressure surface which presses the vegetable through a net-work of knives, thus cutting it into a number of pieces.

The arrangement of the various knives, the net-work of knives in their juxtaposition, determines the size of the various pieces, and the knives are easily interchanged for the purpose of procuring pieces of different width or different cutting.

If long slices or chips, extending throughout the length of the vegetables, are to be produced, then the punch must be allowed to pass through the whole extent of its passage, so that the entire vegetable is cut into long strips. But if smaller slices, or cubes or similar shapes are to be produced, then a cross-cutting knife is moved back and forth simultaneously or at certain intervals during the operation, which cuts the individual chips or slices at certain adjustable heights, and works in backward and forward motion. This cross-cut knife is best worked by hand. In the form of application as illustrated by the drawing, the cross-cutting knife is worked by hand, and an adjusting device controls the step-wise movement of the same, so that the cross-pieces always receive the same desired size.

In the drawing—

Fig. 1 represents a view of the machine with support and receptacle for the chips.

Fig. 2 represents a view of the machine with cog segment cut out.

Fig. 3 represents a cut through a part of the machine, with a view of the punching stamp in a certain position, the vegetable being partly moved;

Fig. 4 is a view of the locking device;

Fig. 5 shows a plan view of the cross-cutting knife;

Figs. 6 to 10 inclusive show modified forms of cutters which may be employed.

A punch $b$ is located in a neck-piece —$a$— and provided with cogs —$c$—. The punch —$b$— holds a pressing surface $d$ provided with notches $e$, which presses the vegetable along a guide $f$ through the net-work of knives $g$. This net-work of knives rests interchangeably upon a ledge $h$ of the support $i$, which supports the whole device, and which can be attached with the help of a tightening screw $k$ to the top of a table $l$. Directly under the cutting device is a box 6 with drawer 7 to receive the chips.

The ledge $h$ holds a cross-cutting knife $m$ (Figs. 1 and 5) which is horizontally movable. This cross-cutting knife $m$ sits, easily interchangeable, upon a guiding frame $n$, and the cross-bow of this guiding frame $n$ is provided with a handle $o$. The cross-cutting knife $m$ as shown in Fig. 5 has cutting edges on both sides, so that, both during the forward and the return movements of the frame $n$, the part of the vegetable pressed forward by the pressure surface $e$ is horizontally cut. Furthermore, supporting brackets $m'$ are inserted into the frame below the cross-cutting knife $m$. As the supporting brackets $m'$ are broader than the cross-cutting knife $m$, and are located about 25 mm. below the same, they slightly push away the vegetable chips while cutting, whereby the splitting is somewhat facilitated. The frame $n$ allows the pieces pressed through the net-work of knives to freely pass through when longitudinal chips are to be produced. If, however, the pieces are to be cut apart at certain places, then the knife is to be pulled out by the handle $o$, thus cutting the pieces off at a certain length.

A cog segment $p$ serves to move the punch $b$, and grips the cog rack $c$. The cog segment $p$ is turned by means of a crank $q$ with handle $r$. A rod $u$ with a ratchet head $v$ and under pressure of a spring is provided on the crank $q$ and connected by a joint $s$ to the crank $q$. This ratchet head $v$ grips into a ratchet wheel $w$, which is housed in a recess 10 formed in the upper arm of the supporting bracket $i$ adjacent the neck piece $a$ upon the axle 11 of which a crank $x$ with rod $y$ rests, which is guided in a cylinder $z$ by means of a piston 2 (Figure 4). This piston 2 is under the influence of a spring 3 and is located at the end of the rod $y$, which holds an adjustable spring collar 5 on a screw 4. The adjustable spring collar limits the depth of the entry of the piston 2 into the cylinder $z$. The screw 4 may be provided with a flat surface upon which division lines are marked, so that the desired size of the cubes can be obtained by adjustment of the ring 5 according to the scale. The cylinder $z$ can be swung around on a pin 8 on the machine support $i$. The wall $f$, against which the vegetable is laid, is angularly formed, the angle being curved, so that the general form of the natural vegetable or fruit can practically fit into the same. As soon as the punch —$d$, $e$— presses upon the vegetable, the latter can be released from the hand, and by turning the crank $q$ the vegetable is pressed through the net-work of knives $g$ (Figs. 1 to 5). This net-work of knives should be preferably made in a casting which is not affected by the fruit juice. The usual shapes are shown in Figs. 6 to 10. These shapes can be enlarged upon according to requirements. If it is desired to produce cuttings running throughout the extent of the vegetable or fruit, i. e., longitudinal pieces, then the cog $v$ gripping into the ratchet wheel $w$ must be lifted off by pressure on the handle $t$ of the rod $u$. This rod $u$ is held continually in contact with the ratchet wheel $w$ by a spring, the stop 5 being moved with the rod $y$ by said ratchet wheel. According to the position of the locking ring 5, the movement of the punch will be correspondingly limited or extended, so that the length of the chips can be adjusted according to the requirement. If the ratchet wheel $w$ is allowed to run simultaneously, then the cutting knife $m$ may be moved backwards or forwards with every turn of the crank, so that there will always be a horizontal cut and a splitting of the longitudinal chips in cross-section.

If it is desired to produce chips extending lengthwise throughout, then the ratchet cog $v$ must be continually lifted out of the wheel $w$ by pressure upon the lever $t$. To obtain sub-divided chips, the ring 5 must first be adjusted according to the scale to the desired cube size, and then the crank $q$ is turned without pressure upon the lever $t$. The punch $b$ can only be moved as far as admitted by the distance of the ring 5 from the lid of the cylinder 2. Now the cross-cutting knife $m$ is moved and the slice cut off. If the lever $t$ is pressed, then the ratchet wheel $w$, the crank $x$ and the rod $y$ spring back by pressure of the spring 3 on the piston 2, and the crank $q$ can again be turned around the same way. So the process continues until the fruit or vegetable is split up by longitudinal and cross-cuts.

Having thus more fully described and ascertained the nature of my invention and the manner in which it is to be applied, I declare that what I claim is:

1. In a cutting machine of the class described, the combination with a supporting bracket having an opening in the upper end thereof, a reciprocating punch having a serrated pressing surface extending through said opening, a segmental rack operatively connected to said punch, stationary cutters positioned beneath said punch, longitudinally movable knives below said cutters, means for regulating the downward movement of said punch associated with said rack, thereby regulating the amount of vegetable cut off by said movable cutters, and means connected to said rack for actuating said punch.

2. In a cutting machine of the class described, the combination with a bracket having a horizontally disposed supporting arm, a vertical opening in said arm, a reciprocating plunger extending through said opening, vertically disposed teeth in said plunger, a segmental rack journalled in said arm and operatively engaging said teeth, a handle connected to said rack for actuating said plunger, and means connected to said rack for controlling the downward movement of said plunger.

3. In a cutting machine of the class described, the combination with a bracket having a horizontally disposed supporting arm, a vertical opening in said arm, a reciprocating plunger extending through said opening, a segmental rack journalled in said arm and operatively connected to said plunger, means connected to said rack for controlling the amount of downward movement of said plunger, and means associated with said last mentioned means for returning the rack to its normal position.

4. In a cutting machine of the class described, the combination with a bracket having a horizontally disposed supporting arm, a vertical opening in said arm, a reciprocating plunger extending through said opening, a segmental rack journalled in said arm and operatively connected to said plunger, a crank connected to said rack, a spring controlled piston having a piston rod operatively associated with said plunger, and means adjustable on said rod for varying and controlling the amount of downward movement of the plunger.

5. In a cutting machine of the class described, the combination with a bracket having a horizontally disposed supporting arm, a vertical opening in said arm, a reciprocating plunger extending through said opening, a segmental rack journalled in said arm and operatively connected to said plunger, a crank connected to said rack, a spring controlled piston having a piston rod operatively associated with said plunger, means adjustable on said rod for varying and controlling the downward movement of the plunger, and means on said crank for returning the rack to its normal position.

6. In a cutting machine of the class described, the combination with a bracket having a horizontally disposed supporting arm, a vertical opening in said arm, a reciprocating plunger extending through said opening, a housing formed in the end of said arm having a transversely mounted shaft extending therefrom, a segmental rack journalled in said shaft and operatively associated with said plunger, a crank connected to said rack, a ratchet wheel on said shaft associated with said rack, and means connected with said rack for limiting the downward movement of said plunger.

7. In a cutting machine of the class described, the combination with a bracket having a horizontally disposed supporting arm, a vertical opening in said arm, a reciprocating plunger extending through said opening, a housing formed in the end of said arm having a transversely mounted shaft extending therefrom, a segmental rack journalled in said shaft and operatively associated with said plunger, a crank connected to said rack, a ratchet wheel on said shaft associated with said rack, means connected with said rack for limiting the downward movement of said plunger, a spring actuated dog secured to said crank and normally engaging said ratchet wheel, a piston rod associated with said rack, and means on said rod for limiting the downward movement of said plunger.

8. In a cutting machine of the class described, the combination with a bracket having a horizontally disposed supporting arm, a vertical opening in said arm, a reciprocating plunger extending through said opening, a housing formed in the end of said arm having a transversely mounted shaft extending therefrom, a segmental rack journalled in said shaft and operatively associated with said plunger, a crank connected to said rack, a ratchet wheel on said shaft associated with said rack, means connected with said rack for limiting the downward movement of said plunger, a spring actuated dog secured to said crank and normally engaging said ratchet wheel, a piston rod associated with said rack, means on said rod for limiting the downward movement of said plunger, and a spring actuated piston connected to said rod for automatically returning the rack to its normal position upon release of the said dog with the ratchet wheel.

9. In a cutting machine of the class described, the combination with a supporting bracket having an opening in the upper end thereof, a reciprocating punch having a serrated pressing surface extending through said opening, stationary cutters beneath said punch, a movable knife below said cutters, a segmental rack connected to said punch, a crank for actuating said rack, means associated with said rack for controlling the amount of downward movement of said punch, thereby regulating the amount of vegetable cut off by said movable knife, and means secured to said crank for returning the rack to its normal position.

In testimony whereof I have signed my name in the presence of two witnesses.

HENRI BARBEY.

Witnesses:
 CHARLES STRUB,
 GEORGES HIRSCH.